Jan. 14, 1964　　　J. J. E. MESNAGER　　　3,117,616
METHOD AND MEANS FOR MANUFACTURING CORRUGATED SHEETS
Filed March 21, 1961　　　6 Sheets-Sheet 1

INVENTOR
JACQUES JEAN EMILE MESNAGER

McGlew and Toren
ATTORNEYS

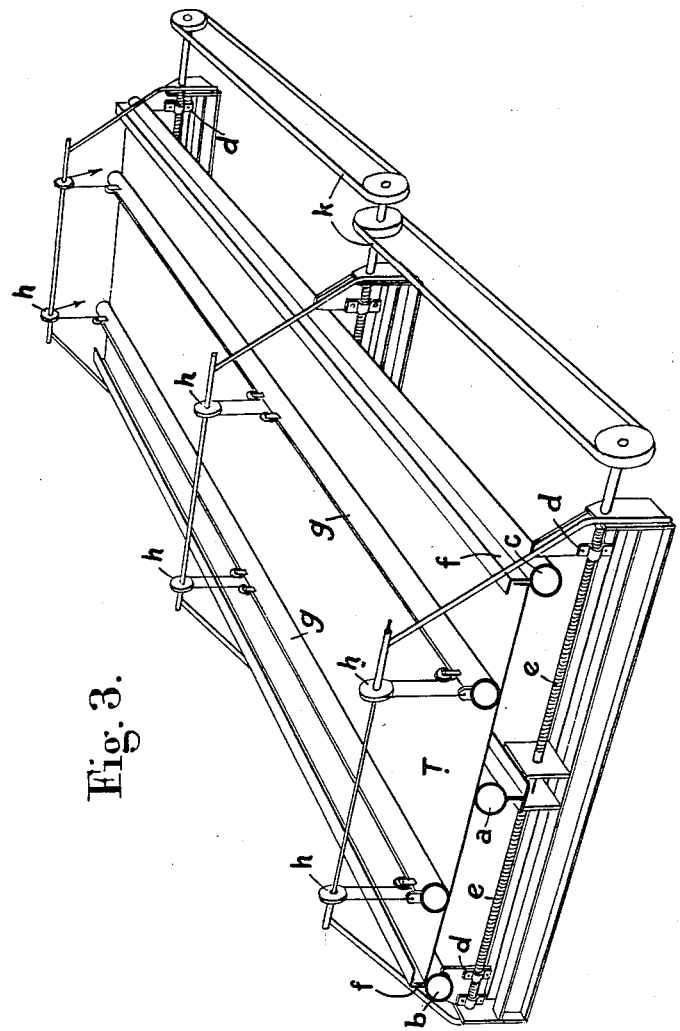

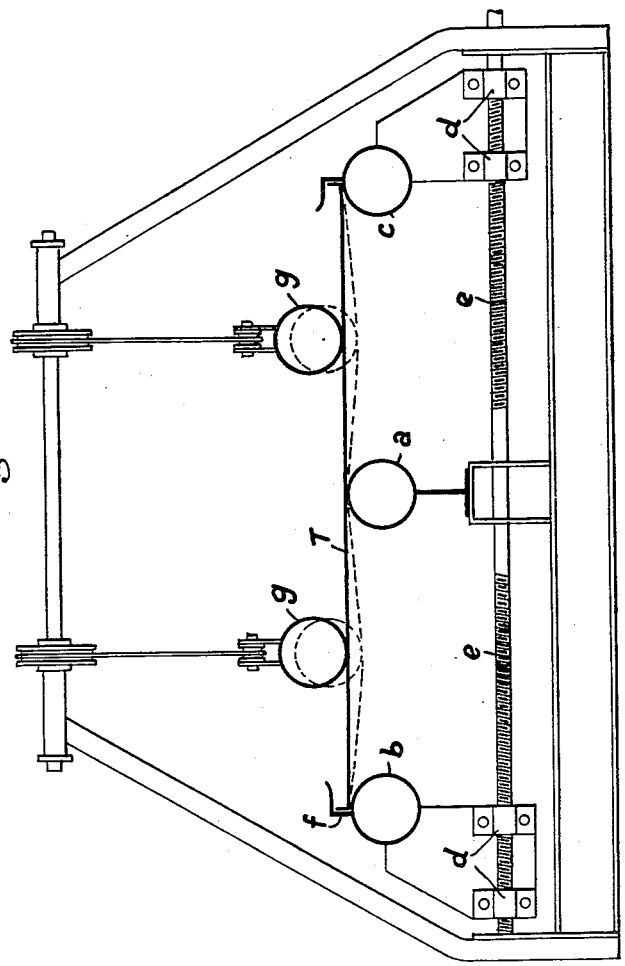

INVENTOR
JACQUES JEAN EMILE MESNAGER
ATTORNEYS

Jan. 14, 1964   J. J. E. MESNAGER   3,117,616
METHOD AND MEANS FOR MANUFACTURING CORRUGATED SHEETS
Filed March 21, 1961   6 Sheets-Sheet 5

INVENTOR
JACQUES JEAN EMILE MESNAGER

McGlew and Toren
ATTORNEYS

Jan. 14, 1964  J. J. E. MESNAGER  3,117,616
METHOD AND MEANS FOR MANUFACTURING CORRUGATED SHEETS
Filed March 21, 1961  6 Sheets-Sheet 6
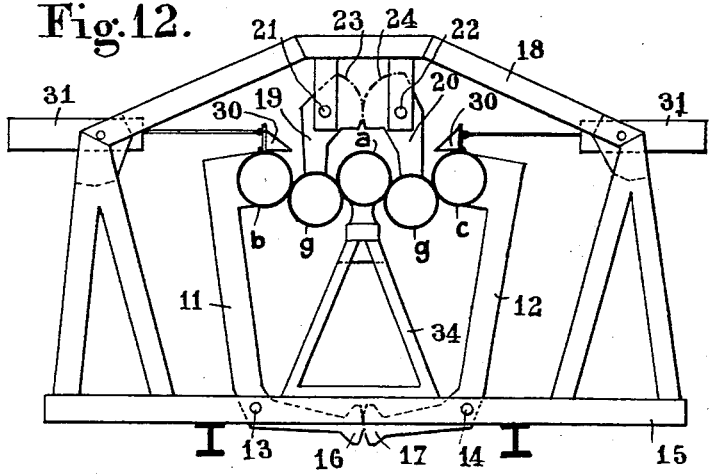
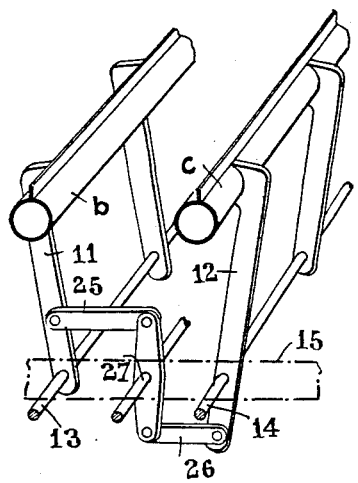
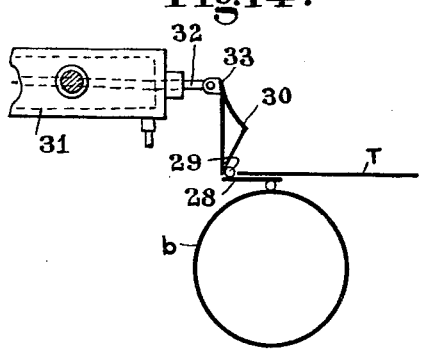
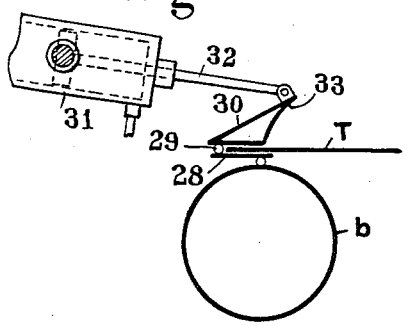
INVENTOR
JACQUES JEAN EMILE MESNAGER
McGlew and Toren
ATTORNEYS United States Patent Office 3,117,616
Patented Jan. 14, 1964

3,117,616
METHOD AND MEANS FOR MANUFACTURING CORRUGATED SHEETS
Jacques Jean Emile Mesnager, 182 rue de Rivoli, Paris, France, assignor of forty percent to Marcel Caillotin, Paris, France
Filed Mar. 21, 1961, Ser. No. 97,360
12 Claims. (Cl. 153—76)

This invention relates to corrugated sheets and more particularly to methods and means for manufacturing corrugated steel sheets or plates.

It is highly advantageous to form corrugated sheets or plates with relatively deep troughs or valleys in order to increase the moment of inertia of their section and their bending strength, so that they can be used for constructing roofs and walls without the assistance of intermediate or auxiliary supports.

Actually, with hitherto known machines only steel sheets having relatively shallow corrugations can be made.

It is the essential object of the present invention to provide, on the one hand, a method of manufacturing corrugated steel sheets having relatively deep troughs and a relatively great length, and, on the other hand, a machine for carrying out this method.

The method of this invention for forming steel sheets having longitudinal corrugations of relatively great depth is characterized in that it consists in subjecting the two lateral edges of the sheet to be formed, throughout the sheet length, to gradually increasing forces directed toward each other and tending to bend the sheet transversely, and in guiding this bending movement of the sheet by causing its two faces to bear on two series of mandrels respectively which extend longitudinally throughout the sheet length, said mandrel being shaped according to the desired contour of the finished sheet waves or corrugations, some of said mandrels being adapted to accomplish movements of translation in the transverse direction.

The machine according to this invention for carrying out the method broadly set forth hereinabove is characterized in that said mandrels ($c$, $a_1$, $a$, $a_1$, $c$) of a first series (FIG. 8) receiving the lower face of the sheet to be corrugated are carried, in the case of some of them free in transverse translation, by a horizontal table, whilst the mandrels $b$, $b_1$, $b_1$, $b$ (FIG. 8) of the other series are held on the sheet T to be formed above the gaps left between the mandrels of the first series, respectively, said mandrels of the other series being moved gradually downwards against the upper face of the sheet T.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawing in which:

FIGURE 3 is a perspective view showing a machine constructed according to the teachings of this invention for manufacturing corrugated sheets having two complete longitudinal corrugations, one sheet to be treated being positioned on the machine;

FIGURE 4 is an end view of the machine shown in FIG. 3;

FIGURE 12 illustrates in a manner similar to FIG. 6 another form of embodiment of the machine of this invention;

FIGURE 13 illustrates in perspective a modified embodiment of one portion of the machine structure illustrated in FIG. 12; and FIGURES 14 to 16 show in three different positions corresponding to the starting condition of the machine, a typical connection between one of the lateral cylinders and the sheet edge to which a transverse pressure is to be applied.

The hitherto known machines for corrugating steel sheets are made according to three main principles:

(a) One type of machine consists of a press in which the sheet is simply pressed between a die and punches. Actually, these machines are dishing presses which unavoidably draw the metal jammed by frictional contact between the projections of the die and punches, even if the operation is performed in several steps or wave by wave. These machines can form only relatively shallow corrugations of a depth sufficient to keep the elongation of the steel sheet within permissible limits. This elongation while consuming a considerable quantity of power is attended by the risk of damaging the zinced or otherwise galvanized surface already attached by the pressure exerted through the projections of the die and punches. Moreover, these presses cannot be made with considerable lengths so that the length of the corrugated sheets formed therein is reduced accordingly.

Figure 1:
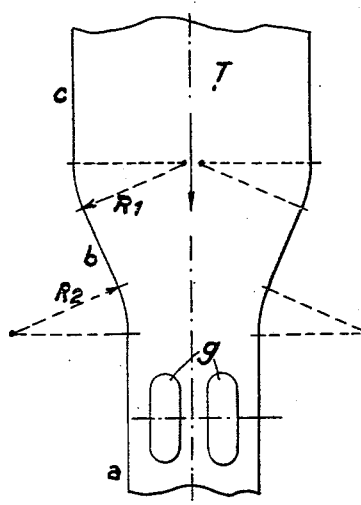
FIGURE 1 is a diagram for explaining the known method of forming longitudinal corrugations in a sheet metal strip, which consists in pulling the sheet metal stock between two shafts equipped with rollers.

(b) Other machines are provided with rollers adapted to alter the cross-sectional contour of the sheet as the latter is forced continuously between trains of rollers. To use machines of this type does not limit the width of the sheets or plates to be corrugated therein, but sets a strict limit to the wave depth obtainable therewith. As shown in FIG. 1, the steel sheet T, before passing under the rollers $g$ by which it is to be shaped completely, must be reduced in width from the initial value of the sheet stock to the width of the finished or corrugated sheet. Thus, the deeper the troughs of the waves, the greater the reduction in width of the sheet. The two lateral edges of the sheet, which are initially and finally parallel to each other, must follow an oblique path when they move toward each other. Therefore, they are compelled to form two successive curves in opposite directions for connecting the three rectilinear portions $a$, $b$, $c$, of their path with one another. These curves should have a radius sufficient to reduce transverse distortion to a minimum as this distortion should not exceed the elastic limit. Thus, to produce corrugated sheets having relatively deep troughs according to this procedure it would be necessary to use a machine of considerable or abnormal length; therefore, in order to keep this machine within reasonable dimensions the wave depth must be limited to one or two inches.

Under these circumstances, the number of corrugations must be increased in order to corrugate the full width of the sheet, so that the number of cylinders or rollers and the control means therefor are multiplied with a resulting substantial increase in the cost of the machine.

Figure 2:
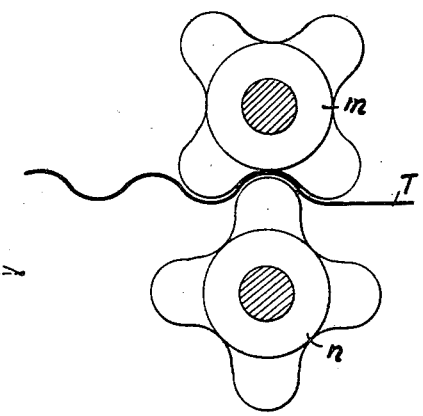
FIGURE 2 is a diagram for explaining the known method of forming transverse corrugations in a sheet metal strip, which consists in driving the sheet between two interengaging splined or ribbed shafts revolving in opposite directions.

(c) To produce corrugated sheets having their waves directed across the length of the sheet a procedure utilizing paired cylinders $m$, $n$ (FIG. 2) is sometimes applied, these cylinders being disposed like those of a rolling mill but formed with longitudinal ribs, projections or splines in relative meshing engagement. Obviously, these machines can produce only short waves or corrugations, as they are limited by the cylinder width. On the other hand, the meshing engagement of the splined cylinders sets various limitations as to the shape of the corrugations since it is not possible to select the best waveform.

This invention is based on the following principles taken separately or in combination:

(1) The steel sheet is compressed laterally in order to buckle same out from its initial plane, this result being obtained by applying a relatively low compressive force in the case of conventional thicknesses.

(2) The compression is applied simultaneously along the full length of the sheet to be corrugated, so that the sheet remains constantly cylindrical during the operation, the straight section of the cylinder being gradually altered in order to avoid any undesired momentary distortion.

(3) Upper molding cylinders are used with a view to:

(a) Produce an incipient downward buckling by the application of weights;

(b) Give the sheet the desired cross-sectional shape.

(4) Lower molding cylinders are used which roll on a horizontal plane so as to follow substantially without any frictional contact the movements of the sheet as the latter is being shaped. If the sheet is corrugated upwards in its intermediate portion, the corresponding cylinder may be fixed on the frame structure of the machine as it is not necessary to move this cylinder.

(5) Lateral molding cylinders are used to which either a movement of translation on a carriage or a sliding movement on guideways is imparted, these cylinders being provided with adequate anchoring devices such as hooks for exerting the lateral pressure necessary to buckle the sheet.

(6) The machine can be used on the site. In this case the sheets may be delivered in the form of rolls (thus facilitating the transport of sheet stock) and shaped on the site into elements of relatively great length which could not be transported by road or rail otherwise. In this case the length of the machine should correspond to the length of the sheets to be corrugated, this requirement being easily met since the essential components of the machine are cylinders consisting for example of relatively short sections adapted to be easily assembled on the spot by screwing, keying or through any other suitable means.

Referring now to the typical form of embodiment of the invention illustrated in FIGS. 3 to 7 of the drawings, the machine for corrugating steel sheets is adapted to shape sheets so as to form two complete corrugations or waves therein. In this machine, the central lower molding cylinder $a$ is fixed for the reasons set forth hereinabove. The two lateral molding cylinders $b$ and $c$ may be driven for translation toward and away from each other by nuts $d$ in threaded engagement with horizontal screws $e$ acting like screw jacks. Upper angle extensions $f$ of these cylinders $b$ and $c$ are adapted to exert the resulting lateral thrust on the longitudinal lateral edges of the sheet T.

A pair of upper molding cylinders or tubes $g$ may be laid on the sheet by actuating a cable passing over pulleys $h$. The weight of these cylinders or tubes $g$ causes the sheet to buckle downwards between the lower cylinders $b$, $a$ and $c$.

Figure 5:
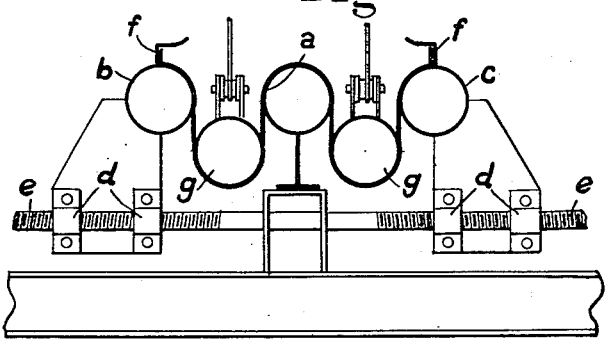
FIGURES 5, 6 and 7 illustrate similarly three successive steps of the operation of the machine of this invention.
Figure 6:
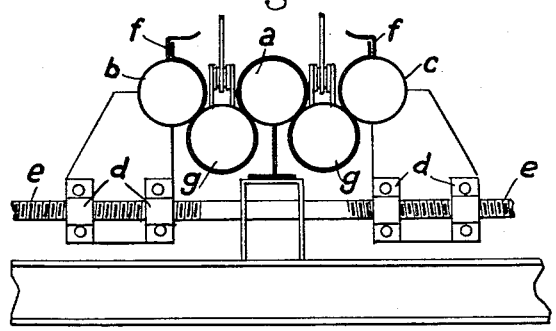
Figure 7:
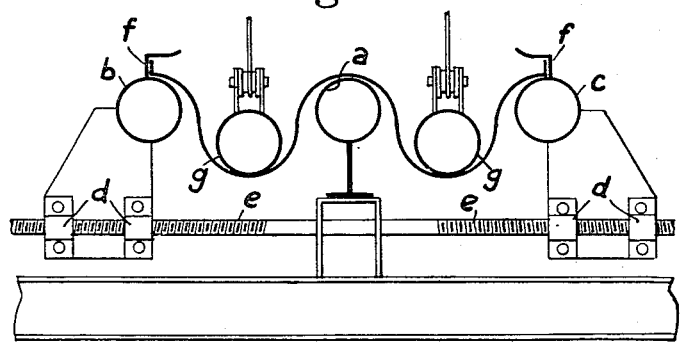

A belt or chain transmission K ensures the synchronous operation of the screws $e$ so that the movement performed by the lateral cylinders $b$, $c$ be exactly a movement of translation. FIGS. 3 and 4 illustrate the initial position of the machine in which the flat steel sheet T is supported by the three cylinders $b$, $a$, $c$ and receives the two upper cylinders $g$, $g$. In FIG. 4 the dotted lines show the position of the sheet when the upper cylinders $g$, $g$ are released so as to produce an incipient corrugation in the sheet. The driving action exerted on the screw jacks $e$, $d$ causes the angle members $f$, $f$ to move toward each other so as to buckle the sheet, the corrugation depth increasing as the sheet width decreases. During this operation the lateral cylinders $b$, $c$ move toward the intermediate cylinder $a$, as shown in FIG. 5. According to this invention, the diameter of these cylinders is sufficient, in relation to the length of the sheet, after the intermediate position of FIG. 5 has been overstepped, to permit the completion of the shaping operation in the manner shown in FIG. 6, wherein each cylinder $g$ contacts the intermediate cylinder $a$ and also one of the lateral cylinders $b$ or $c$. It will be seen that in this position the sheet receives the same curvature and is therefore subjected to the same bending force throughout its length. This diameter may be selected with due consideration for the remanent elasticity of the sheet after the cold straining thereof by bending so that the permanent distortion received by this sheet during the final step shown in FIG. 6 will provide the desired waveform, since only this permanent distortion remains after the elastic expansion of the sheet which follows the release of cylinders $b$, $c$ and the lifting of cylinders $g$, $g$. The attached drawings illustrate more particularly the manufacture of a corrugated sheet in which each half-wave is of semi-circular configuration, as shown in FIG. 7 wherein any cylinder pressure has been released from the sheet.

Figure 8:
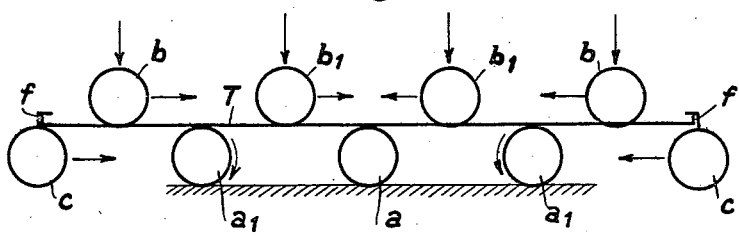
FIGURE 8 is a diagrammatical end view similar to FIG. 4 which shows a machine constructed according to the teachings of this invention for manufacturing sheet metal stock with four complete corrugations.

In a machine for producing corrugated sheets having four full waves, as illustrated in FIG. 8, the lower molding cylinders comprise on either side of the lower central molding cylinder $a$ a pair of intermediate cylinders $a_1$ rolling on a floor surface and a pair of lateral cylinders $c$ urged toward each other. The upper cylinders comprise two cylinders $b_1$, $b_1$ disposed above the intervals between the central cylinder $a$ and the intermediate cylinders $a_1$ and outer cylinders $b$ overlying the intervals between these intermediate cylinders $a_1$ and other, outermost cylinders $c$.

Figure 9:
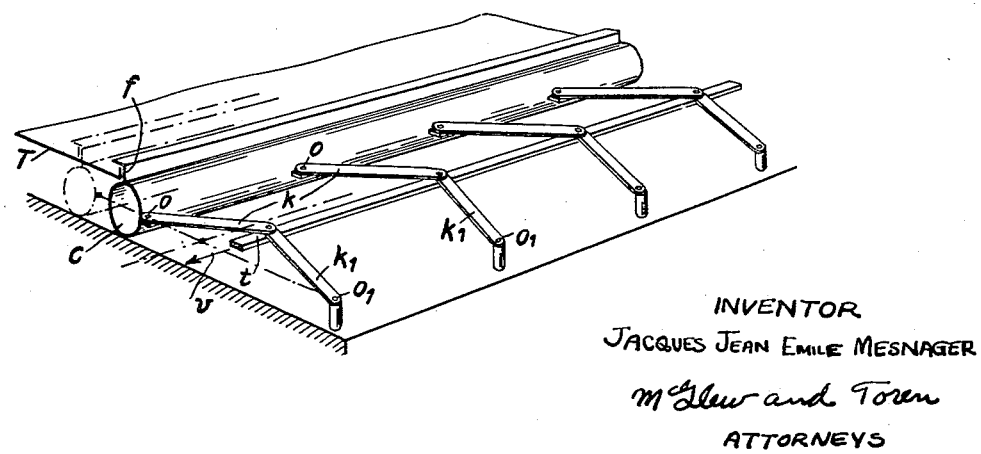
FIGURE 9 is a perspective view illustrating a modified embodiment of the means for applying a transverse pressure to the sheet.

The transverse translation of each lower lateral cylinder may be obtained for instance by using a toggle system disposed in the plane of translation of the axis of said cylinder. As shown in FIG. 9, this toggle system comprises a rod $t$ pulled in its axial direction by a cylinder (not shown) exerting a force in the direction of the arrow $v$, said rod $t$ having pivoted thereon on the one hand one end of a plurality of links $k$ of same length which have their other end $o$ pivoted on the cylinder $c$, and on the other hand, one end of another series of links $k_1$ of equal length, the opposite ends of these links $k_1$ being pivoted on pins $o_1$ disposed on a line parallel to the cylinder $c$.

In the alternate embodiment illustrated in FIG. 12, the mandrel $a$ of the first series is rigidly carried as in FIG. 5 by the frame structure of the machine but the two lateral mandrels $b$ and $c$ of this first series are carried by arms 11, 12 fulcrumed at 13, 14 on the frame 15 of the machine, these arms having extensions directed toward each other beyond each axis 13, 14, said extensions being bent and carrying toothed segments 16, 17 also centered on said axes 13, 14 and in relative meshing engagement. Thus, these mandrels can accomplish only perfectly symmetrical transverse movements which are substantially movements of translation. The two mandrels $g$, $g$ of the other series, instead of being suspended separately as in FIG. 5 are carried by an upper portion 18 of the frame through the medium of two arms 19, 20 fulcrumed at 21, 22 on said upper portion and formed with extensions similar to those of the lower arms 11, 12, these extensions also carrying toothed segments 23, 24 in relative meshing engagement. Like the lateral mandrels b, c of the first series, these two mandrels g, g can accomplish only perfectly symmetrical lateral or transverse movements.

FIG. 13 illustrates how the same result can be obtained by resorting to a different construction wherein the two arms 11, 12 are connected through links 25, 26 respectively to the two ends of a lever fulcrumed at 27 on the frame of the machine.

With the above-described arrangement any slipping of the sheet is definitely prevented while forming perfectly symmetrical corrugations even if the mechanical properties of the sheet to be shaped are not uniform throughout the sheet surface. Moreover, the rigid connection between each tube b and the ends of arms 12 prevents the tube from undergoing torsional distortions and— practically—deformations caused by bending stress which cannot occur unless they are attended by torsional distortion.

The machine illustrated in FIG. 12 shows on the other hand an arrangement adapted to form the lateral folds in the sheet for applying thereto the thrust from the transverse cylinders or jacks. In this arrangement, as shown more particularly in FIGS. 14 to 16, the upper extension f of each cylinder b or c is replaced by a double-link system comprising a rectangular plate 28 of same length as the cylinder b, which has one edge pivoted along the uppermost generatrix of this cylinder and the opposite edge pivoted on an edge 29 of a prismatic triangular member 30 consisting for example of a tubular section. Each lateral compression cylinder 31 pivotally mounted for example on the frame structure 15 of the machine is adapted to apply an inward pressure to the edge 33 of the prismatic member 30. When a sheet T is placed on the machine each lateral edge thereof, as shown in FIG. 14, is disposed along the generatrix of cylinder b on which the edge 29 of prismatic member 30 is pivoted. Thus, when the actuating cylinder 31 is operated so that its piston rod 32 is forced outwards, the prismatic member 30 takes the position shown in FIG. 15 and then the final position shown in FIG. 16, wherein the corresponding edge of sheet T is folded substantially at right angles and clamped in a radial plane between the rectangular element 28 and one face of the prismatic member 30, the adjacent face of this prismatic member being pressed against the cylinder b.

Preferably, the intermediate cylinder a of the first series is mounted on a triangular portion 34 of the frame structure 15 of the machine.

Figure 16:
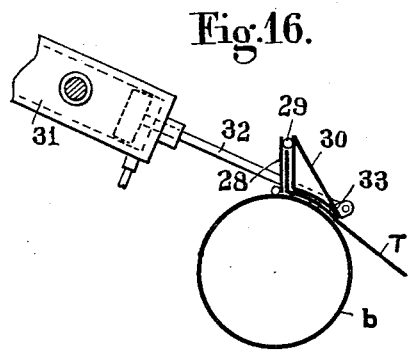

When it is contemplated to shape relatively thick sheets it is advisable to use hydraulic cylinders in the case of the lateral cylinders 31, as shown diagrammatically in FIGS. 14 to 16. Thus, by supplying compressed fluid simultaneously to both cylinders the stress is equally distributed.

It is advantageous, in the end position of the machine and as shown in FIG. 12, that the arms 19, 20 supporting the two cylinders g, g of the second series extend vertically, so that they will counteract any tendency of the sheet to move upwards as will normally occur at the end of the shaping operation.

Figure 10:
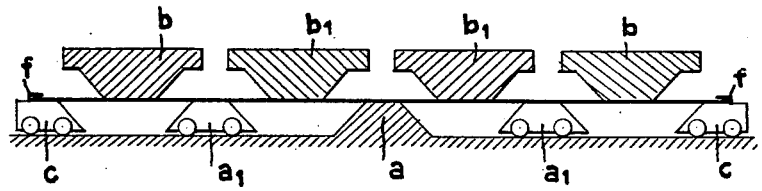
FIGURES 10 and 11 illustrate a machine for manufacturing sheet metal stock having prismatic corrugations.
Figure 11:
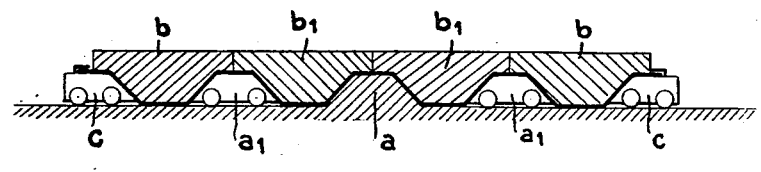

When it is desired to form prismatic corrugations instead of curved corrugations in the steel sheet stock, molding cylinders having a prismatic cross-section are simply substituted for the circular-sectioned cylinders of the preceding examples, as shown in FIGS. 10 and 11, the operation remaining unchanged.

Of course, although in all the forms of embodiment described hereinabove and shown by way of example in the accompanying drawings, there is an odd number of lower molding cylinders and an even number of upper molding cylinders, the reverse arrangement may be used without any inconvenience, that is, by providing an even number of lower molding cylinders and an odd number of upper molding cylinders.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. A machine, for forming a longitudinally corrugated metal sheet, comprising: a frame structure; a table mounted on said frame structure; a first series of mandrels extending in parallel relationship to one another, the sheet bearing on said first series of mandrels with its lower face, said first series of mandrels including a central mandrel rigidly secured on said frame structure, a pair of lateral mandrels mounted for transverse movement on said frame structure and other mandrels bearing on said table and adapted for free translational movement thereon, said other mandrels being disposed between said central mandrel on both sides thereof; fastening means carried by said lateral mandrels for holding the lateral edges of the sheet; power means for urging said lateral mandrels toward each other to deform the sheet transversely; another series of relatively heavy mandrels extending parallel to the mandrels of said first series of mandrels and bearing upon the upper face of the sheet in vertical alignment with the gaps left between the adjacent mandrels of said first series of mandrels; means for suspending said mandrels of said other series of mandrels to permit said other series of mandrels to bear upon the metal sheet by gravity and to allow said other mandrels to remain free to perform transverse movements, the weight of said other series of mandrels acting to flex the metal sheet between and over adjacent mandrels of said first series as well as between and under adjacent mandrels of said other series of mandrels while said fastening means holds the lateral edges of said sheet, the action of said power means being maintained until the sheet is clamped between said two series of mandrels.

2. A machine as set forth in claim 1, for forming longitudinal, part-cylindrical deep corrugations in said sheet, wherein said mandrels are cylindrical, the cylindrical mandrels of the first series other than the central mandrel and said two lateral mandrels of said first series are adapted to roll freely on said table.

3. A machine as set forth in claim 1, for forming longitudinal, prismatic and relatively deep corrugations in said sheet, wherein said mandrels are prismatic and those of the first series are provided with rollers mounted on their underface, except said central mandrel, to permit the transverse displacements of said prismatic mandrels of said first series.

4. A method of forming a longitudinally corrugated metal sheet, notably with deep waves, which consists in applying, to the full length of the lateral edges of a plane sheet to be formed, progressive forces directed toward each other and tending to buckle the sheet transversely, and in guiding the bending of the sheet by engaging its two faces respectively onto two series of mandrels extending longitudinally throughout the sheet length, said mandrels being shaped according to the desired contour of the waves to be formed in the sheet and some of said mandrels being displaceable transversely.

5. A machine for forming longitudinal, deep corrugations in metal sheets, which comprises a frame structure, a first series of mandrels extending parallel to each other, the sheet to be shaped bearing with its lower face on said mandrels, said first series of mandrels comprising a central mandrel rigidly secured on said frame structure and pairs of mandrels disposed on either side and symmetrically to said central mandrel, two series of arms pivotally mounted on said frame structure, each arm having rigidly mounted thereon one of the two mandrels of said pair, means for operatively interconnecting said two series of arms so as to maintain the symmetry of the movements of said two series of arms and therefore of the mandrels supported thereby, means for securing the lateral longitudinal edges of the sheet to be formed, said means being mounted on said lateral mandrels of said first series, means for driving said two lateral mandrels of said first series toward each other in order to bend the sheet transversely, another series of mandrels extending parallel to said mandrels of said first series, said mandrels of said other series being weighty and bearing by gravity upon the upper face of said sheet in the intervals between the adjacent mandrels of the first series, said other series of mandrels comprising pairs of mandrels disposed symmetrically on either side of the central mandrel of the first series, two other series of arms pivotally mounted on the frame structure and carrying each, rigidly, one of the two mandrels of said pair of mandrels of said other series, means for operatively interconnecting said two other series of arms so as to maintain the symmetry in the movements of said two other series of arms and therefore of the mandrels supported thereby, said other series of arms permitting of either lifting said mandrels of the other series against the resistance due to their weight or allowing these mandrels to descend toward those of the first series by causing their weight to bear on said sheet while remaining free to perform transverse symmetrical movements of substantial translation, the downward movement of said other series of mandrels causing the flexure applied to said sheet by the two lateral mandrels of said first series to be guided along the contours of the mandrels of the two series which, when the mandrels of said first and other series contact each other, form the desired corrugations in the sheet.

6. A machine for forming a longitudinally corrugated metal sheet, comprising a frame structure, a first series of mandrels extending in parallel relationship to one another and supported in a common horizontal plane by said frame structure, said first series of mandrels supporting in turn the plane sheet to be shaped which bears with its lower face upon said mandrels, fastening means carried by two lateral mandrels of said first series for holding the lateral edges of the sheet, power means for urging said lateral mandrels of said first series toward each other to cause the transverse deformation of said sheet, another series of relatively heavy mandrels extending parallel to those of said first series and bearing upon the upper face of said sheet in vertical alignment with the gaps left between the adjacent mandrels of said first series, said other series of mandrels acting upon the metal sheet by gravity to flex said metal sheet between and over adjacent mandrels of said first series as well as between and under adjacent mandrels of said other series of mandrels while said fastening means holds the lateral edges of said sheet action of said power means being maintained until said sheet is clamped between said two series of mandrels.

7. A machine for forming longitudinal, deep corrugations in metal sheets, as set forth in claim 6, wherein said means for securing the longitudinal lateral edges of said sheet, which are mounted on each one of said lateral mandrels of the first series consist each of a radial extension rigid with the relevant mandrel and formed with a flange bent toward the interior of the sheet.

8. A machine for forming longitudinal, deep corrugations in metal sheets as set forth in claim 6, wherein said power means for urging said lateral mandrels of the first series toward each other consist of screw jacks disposed laterally on either side of said lateral mandrels and actuated by common control means whereby said screw jacks accomplish simultaneous and equal movements.

9. A machine for forming longitudinal, deep corrugations in metal sheets, as set forth in claim 6, wherein said power means for urging each one of said lateral mandrels of said first series toward the other lateral mandrel of said first series comprise a series of toggles operatively connecting said mandrel to said frame structure, a rod mounted parallel to said mandrel and interconnecting said toggles, and control cylinder means for imparting a movement of translation to said rod.

10. A machine for forming longitudinal, relatively deep corrugations in metal sheet stock, as set forth in claim 6, wherein said means for securing the longitudinal lateral edges of the sheet on each one of said two lateral mandrels of said first series comprise a rectangular plate having substantially the same length as said mandrels, said rectangular plate being formed with a longitudinal edge pivoted on said mandrel and with another longitudinal edge, said plate bearing with its portion intermediate said edges on the lateral edge of the sheet, a prismatic element having a longitudinal edge pivoted on said other longitudinal edge of said rectangular plate and another longitudinal edge receiving the thrust of the means provided for driving the relevant lateral mandrel of the first series toward the opposite lateral mandrel of the same series, the action produced by said means causing said lateral mandrel of said first series to be urged toward the other lateral mandrel of the same series and causing firstly the longitudinal lateral edge of the sheet to be clamped between said rectangular plate and said prismatic element and subsequently said sheet edge to be folded until said prismatic element engages said lateral mandrel and transmitting the thrust from said means to said lateral mandrel.

11. A machine for forming longitudinal, deep corrugations in metal sheets, which comprise a frame structure, a first series of mandrels extending parallel to each other, the sheet to be shaped bearing with its lower face on said mandrels, said first series of mandrels comprising a central mandrel rigidly secured on said frame structure and pairs of mandrels disposed on either side and symmetrically to said central mandrel, two series of arms pivotally mounted on said frame structure, each arm having rigidly mounted thereon one of the two mandrels of said pair, means for operatively interconnecting said two series of arms so as to maintain the symmetry of the movements of said two series of arms and therefore of the mandrels supported thereby, means for securing the lateral longitudinal edges of the sheet to be formed, said means being mounted on said lateral mandrels of said first series, means for driving said two lateral mandrels of said first series toward each other in order to bend the sheet transversely, another series of mandrels extending parallel to said mandrels of said first series and bearing on the upper face of said sheet centrally of the intervals formed between the adjacent mandrels of said first series, said other series of mandrels comprising pairs of mandrels disposed symmetrically on either side of said central mandrel of said first series, two other series of arms pivotally mounted on said frame structure and carrying each rigidly one of the two mandrels of said pair of mandrels of said other series, means for operatively connecting said two other series of arms so as to maintain the symmetry in the movements of said two series of arms and therefore of the mandrels supported thereby, and means for driving the mandrels of said other series toward those of said first series so as to guide the flexure imparted to said sheet by said two lateral mandrels of said first series along the contours of the mandrels of both series which, when the mandrels of said first and other series contact each other, form the desired corrugations in the sheet; said pivotally mounted arms carrying the mandrels of said first series being disposed vertically when said two series of mandrels are contacting one another.

12. A machine for forming longitudinal, deep corrugations in metal sheets, which comprises a frame structure, a first series of mandrels extending parallel to each other, the sheet to be shaped bearing with its lower face on said mandrels, said first series of mandrels comprising a central mandrel rigidly secured on said frame structure and pairs of mandrels disposed on either side and symmetrically to said central mandrel, two series of arms pivotally mounted on said frame structure, each arm having rigidly mounted thereon one of the two mandrels of said pair, means for operatively interconnecting said two series of arms so as to maintain the symmetry of the movements of said two series of arms and therefore of the mandrels supported thereby, means for securing the lateral longitudinal edges of the sheet to be formed, said means being mounted on said lateral mandrels of said first series, means for driving said two lateral mandrels of said first series toward each other in order to bend the sheet transversely, another series of mandrels extending parallel to said mandrels of said first series and bearing on the upper face of said sheet centrally of the intervals formed between the adjacent mandrels of said first series, said other series of mandrels comprising pairs of mandrels disposed symmetrically on either side of said central mandrel of said first series, two other series of arms pivotally mounted on said frame structure and carrying each rigidly one of the two mandrels of said pair of mandrels of said other series, means for operatively connecting said two other series of arms so as to maintain the symmetry in the movements of said two series of arms and therefore of the mandrels supported thereby, and means for driving the mandrels of said other series toward those of said first series so as to guide the flexure imparted to said sheet by said two lateral mandrels of said first series along the contours of the mandrels of both series which, when the mandrels of said first and other series contact each other, form the desired corrugations in the sheet; said means for driving said lateral mandrels of said first series toward each other comprising hydraulic cylinders supplied simultaneously with compressed hydraulic fluid.

References Cited in the file of this patent
UNITED STATES PATENTS

| | | |
|---|---|---|
| 365,540 | Sagendorph | June 28, 1887 |
| 696,359 | Bailey | Mar. 25, 1900 |
| 689,280 | Brown | Dec. 17, 1901 |
| 1,045,082 | Riegel | Nov. 19, 1912 |
| 1,868,645 | Scheerders-Van Kerchove | July 26, 1932 |
| 2,210,985 | Magnani | Aug. 13, 1940 |
| 2,473,533 | Lebedeff | June 21, 1949 |
| 2,481,049 | Stamm et al. | Sept. 6, 1949 |
| 2,655,196 | Magnani | Oct. 13, 1953 |